United States Patent [19]
Hileman

[11] Patent Number: 4,598,716
[45] Date of Patent: Jul. 8, 1986

[54] DOPPLER METHOD AND APPARATUS FOR MEASURING FLUID MOTION

[76] Inventor: Ronald E. Hileman, P.O. Box 307, King, N.C. 27021

[21] Appl. No.: 677,269

[22] Filed: Dec. 3, 1984

[51] Int. Cl.⁴ .............................................. A61B 10/00
[52] U.S. Cl. .................................. 128/663; 73/861.25
[58] Field of Search ...................... 128/663; 73/861.25

[56] References Cited

U.S. PATENT DOCUMENTS

| | | | |
|---|---|---|---|
| 3,334,622 | 8/1967 | Brech | 128/660 |
| 4,324,258 | 4/1982 | Huebscher et al. | 128/663 |
| 4,334,543 | 6/1982 | Fehr | 128/663 |

OTHER PUBLICATIONS

Coffold, R.S.C., "Transducers for Biomedical Measurements," Wiley & Sons, N.Y. pp. 286–287.

Primary Examiner—Kyle L. Howell
Assistant Examiner—Francis J. Jaworski

[57] ABSTRACT

A method and apparatus for determining fluid motion of a fluid through a conduit whereby the signal pulse repetition frequency of a pulsed Doppler is increased significantly over known systems and the receiving means for the reflected signals is kept activated for essentially the entire time that the transmitting means is inactive so that a Doppler shift of less than one-half the signal repetition frequency is produced and frequency aliasing is avoided. The same transducer can be utilized to transmit and receive signals and detect high Doppler shifts, thus functioning similarly to continuous wave Doppler systems using separate transmit and receive transducers.

23 Claims, 1 Drawing Figure

DOPPLER METHOD AND APPARATUS FOR MEASURING FLUID MOTION

FIELD OF THE INVENTION

This invention relates to pulsed Doppler systems utilized for fluid motion measurements, and particularly to such systems used to measure blood fluid motion in human subjects.

BACKGROUND OF THE INVENTION

Present Doppler systems for measuring fluid motion use continuous wave techniques having separate transmit and receive elements or pulsed Doppler techniques with a single transducer time shared between transmit and receive elements. The continuous wave Doppler is sensitive along its entire sonic beam, while a pulsed wave Doppler is sensitive only along a sample volume whose length along the beam acts as a function of the receive gate width. Normally pulsed wave Dopplers use narrow gate widths, thereby sampling portions of a vessel in the case of blood flow measurement in a human subject, but the gate width can be increased to cover the entire vessel of interest.

Pulsed wave Doppler systems unfortunately experience the problem of "aliasing" when the Doppler shift exceeds one-half the pulse repetition frequency. Aliasing is a term from Sample Data Theory developed by Dr. Nyquist and Dr. Shannon and represents the signal confusion arising if the Doppler shift frequency exceeds one-half of the pulse repetition frequency. Some attempts have been made to increase the pulse frequency by sending two or three signals before previously transmitted and reflected (but not yet received) signals return. Systems of this type are commercially available and are referred to as "high pulse repetition frequency Dopplers."

Ultrasonic Doppler flow meters for the measurement of blood flow in a patient's circulatory system are well-known and illustrated in numerous prior art patents such as U.S. Pat. No. 3,430,625 (McCloud); U.S. Pat. No. 3,888,238 (Mindel et al); U.S. Pat. No. 3,554,030 (Peronneau); U.S. Pat. No. 3,766,517 (Fahrbach); U.S. Pat. No. 4,067,236 (Hottinger); U.S. Pat. No. 3,977,247 (Hassler); U.S. Pat. No. 3,498,290 (Shaw); and U.S. Pat. No. 3,987,673 (Hansen). All of these references are incorporated herein by reference to show the conventional methods and circuitry to accomplish those methods.

SUMMARY OF THE INVENTION

The present invention embodies a pulsed Doppler system that uses a much higher signal pulse repetition frequency to drive the transducer and that gates the receiver to an active condition for almost the entire time the transmitter is inactive. The rapid signal pulsing essentially floods the sonic beam axis with many short pulses. Since the receiver gate is active most of the time, it performs much like a continuous wave Doppler receiver. The gaps appearing between active receive conditions are smaller than the blood vessel being examined so that the vessel can be detected at any range similar to the continuous wave Doppler. The pulse rate is made so high that the maximum possible blood velocity produces a Doppler shift less than one-half the pulse repetition frequency. Thus Nyquist/Shannon "aliasing" cannot occur.

The present invention contemplates the use of mechanical, electronic or electromechanical means to adjust the generating and transmitting means and the receiving means to vary the position within which fluid motion is detected. Moreover, it embodies the obvious advantage of using a single transducer for both the generating and transmitting means and the receiving means. Additionally, the transducer can be arrayed either linearly, phased, or annularly. Finally, fluid motion indication can be made by audio, video or printed means.

The features of the present invention set forth above also represent objectives since they reflect desired improvements over conventional Doppler systems. The present invention also has the advantage of using a lower cost, more reliable single element transducer. The system works with any sensitive transducer including transducers normally used for B-Mode scanning. Thus it can be incorporated in existing B-Mode scanners without splitting the transducer element.

Other objectives, features and advantages of the present invention are discussed in or are apparent from the description of the preferred embodiment invention found herein below wherein like characters of reference designate like parts in the drawing.

DETAILED DESCRIPTION OF THE INVENTION

Figure 1:
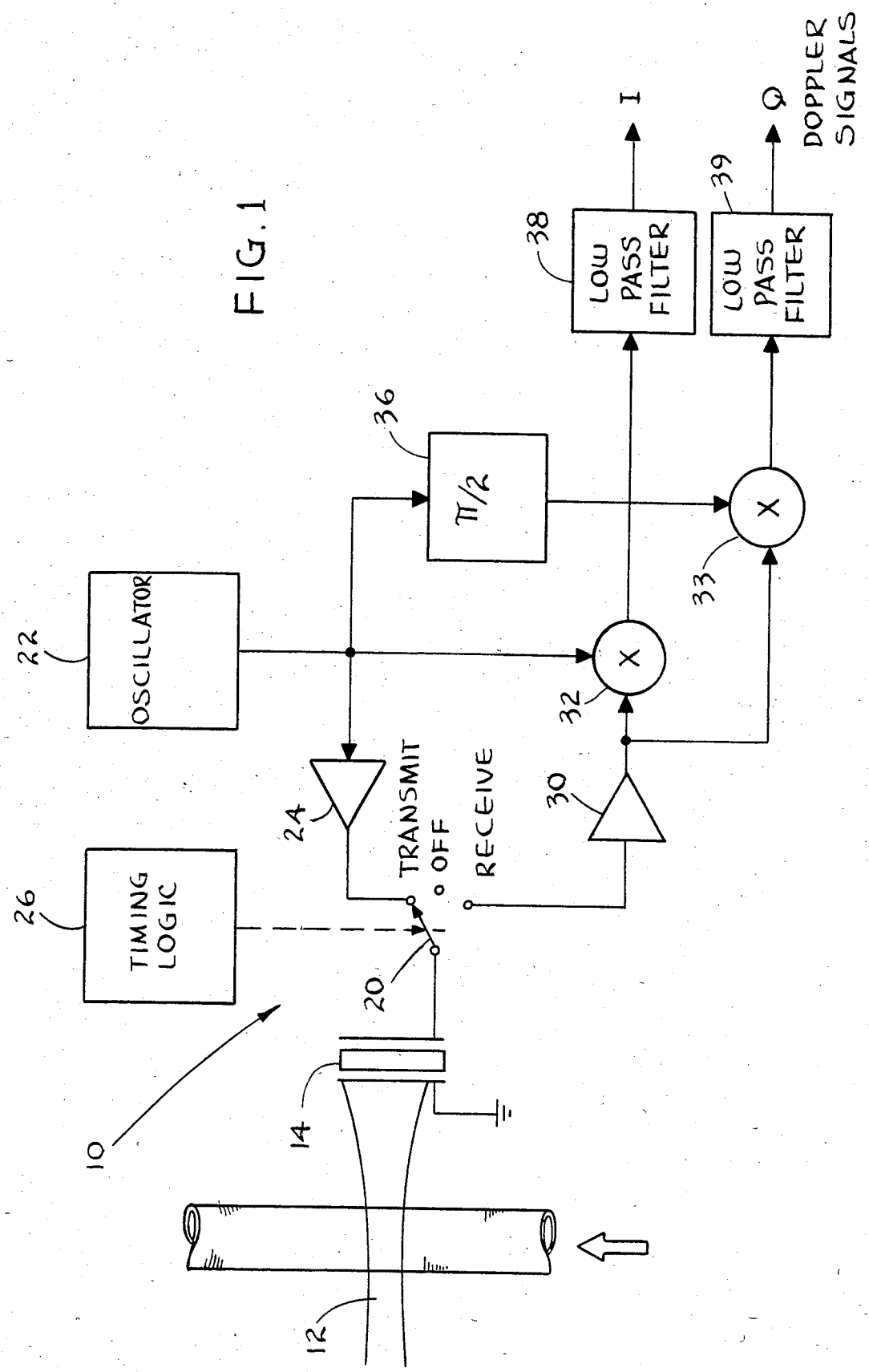
FIG. 1 is a block diagram illustrating the system comprising the present invention.

The Doppler apparatus for measuring fluid velocity shown generally as 10 in FIG. 1 detects Doppler shifts resulting from motion of reflectors in the ultrasonic beam 12 of transducer 14. Transducer 14 is excited by transmit pulses gated to it by switch 20. The transmit pulses consist of short bursts of a carrier frequency generated by an oscillator 22 and suitably amplified by amplifier 24. The timing logic 26 determines both the duration of the excitation pulse and the pulse repetition frequency.

For examination of the main cerebral and peripheral vascular vessels in humans, oscillator frequency may be approximately 5 megaHertz, the pulse width approximately 1 microsecond, and the pulse repetition rate may be such that pulses occur about every 13 microseconds. Since ultrasonic pulses will travel 1 centimeter into the body and back in 13 microseconds, the selected pulse repetition frequency will produce a train of short pulses spaced 1 centimeter apart traveling into the body and back. The reflected ultrasonic signals are converted to electrical signals by the transducer 14 and applied to receiving amplifier 30 through gate 20. Gate 20 connects transducer 14 to receiving amplifier 30 for essentially all of the time between excitation pulses. In this preferred embodiment, receiving amplifier 20 is active for 12 microseconds out of each 13-microsecond pulse repetition period and is inactive for 1 microsecond during transmit.

The Doppler frequency component in the received signal is detected in a conventional Doppler detector, in this case consisting of two mixers 32 and 33, and two low pass filters 38 and 39. Mixer 32 mixes the receiving amplifier 30 output with a signal from oscillator 22 and applies its output to low pass filter 38 to produce an in-phase Doppler signal. Mixer 33 mixes the output from receiving amplifier 30 with a quadrature signal obtained by passing the signal from oscillator 22 through a 90° phase shifter 36 and applies the output from shifter 36 to low pass filter 39 to produce quadrature Doppler signals. Quadrature Doppler signals contain forward and reverse flow information so that subsequent signal processing may separate flow direction information. The Doppler signals may be subsequently applied to speakers, chart recorders or FFT filters, and video displays.

Receiving gating is accomplished by the operation of switch 20 on the input to receiving amplifier 30. The receiving gating function can also be accomplished by using switches located between the output of receiving amplifier 30 and the mixers 32 and 33, between the oscillator 22 and the inputs of mixer 32 and 33, or between the outputs of mixer 32 and 33 and the inputs of their respective low pass filters 38 and 39. The method of gating the receiver (which reduces sensitivity during the transmit period) is not critical. What is important is that the transmit function does not cause significant interference with the receive function by introducing excessive noise or causing excessive loss in sensitivity.

The pulse period of 13 microseconds corresponds to a sampling rate of over 76 kiloHertz. The Nyquist sampling theorem says that it is possible to detect Doppler shifts up to one-half the pulse repetition frequency or 76/2=38 kiloHertz without aliasing. Since Doppler shifts observed in patients seldom, if ever, reach 38 kiloHertz, it is therefore possible to avoid aliasing. Moreover, the invention permits a common transducer to be shared between the transmit and receive functions. It also provides a system having the advantages of non-aliasing continuous wave Doppler with continuous sensitivity at all ranges.

The invention provides maximum advantages and flexibility when used in conjunction with other ultrasonic modes. In particular, it allows the same transducer to be used for B-mode imaging, M-Mode imaging, and pulse Doppler examinations. It can be used with hand-held or mechanically scanned transducers. It also provides the same advantages when used with phased array transducers, linear array transducers and annular array transducers.

Although the invention has been described in detail with respect to a preferred embodiment thereof, it will be understood by those of ordinary skill in the art that variations and modifications may be effected within the scope and spirit of the invention and the appended claims.

I claim:

1. A method for determining fluid motion within a conduit by use of ultrasonic transmitting and receiving means comprising the steps of: producing and transmitting ultrasonic pulsed signals so that the pulse duration time for each signal is substantially less than the duration time between pulses and a plurality of signals are simultaneously in transit in the range of interest; selectively activating the receiving means so that the receiving means is deactivated during the time pulsed signals are transmitted and is activated during substantially all of the time between pulses when the transmitter means is inactive; receiving with the receiving means reflected ultrasonic pulsed signals resulting from the transmitted ultrasonic signals produced during the time the receiver means is activated; obtaining Doppler signals from the reflected and received signals; and generating a fluid motion indication as a function of the Doppler signals whereby the receiving means is responsive to fluid motion at substantially all ranges and aliasing is avoided.

2. The method as claimed in claim 1 wherein the duration time between transmitted pulses is substantially less than the time for a pulse to travel to the range of interest and return.

3. The method as claimed in claim 2 wherein said receiving means activating means maintains said receiving means in an activated condition for more than one-half of the time duration between each signal.

4. The method as claimed in claim 1 including the further step of selectively directing the transmitter and receiving means to vary the position within which fluid motion is determined.

5. Doppler apparatus for determining motion of a fluid having energy reflectors and flowing through a conduit, said apparatus comprising: generating and transmitting means capable upon activation of generating and transmitting ultrasonic pulsed signals; means coupled to said generating and transmitting means for selectively activating said generating and transmitting means to generate and transmit said signals having a substantially shorter time duration than the time duration between each signal and providing a plurality of signals simultaneously in transit in the range of interest; receiving means for receiving reflected signals resulting from said generated and transmitted signals; means coupled to said receiving means for activating said receiving means to receive said reflected signals and to maintain said receiving means in an activated condition during the time duration between pulses when said generating and transmitting means is inactive; Doppler means associated with said receiving means for obtaining Doppler signals from said received reflected signals; and means associated with said Doppler means generating a fluid motion indication as a function of the Doppler signals.

6. The apparatus as claimed in claim 5 wherein the time period between said generated and transmitted ultrasonic pulsed signals is substantially less than the time for a pulse to travel to the range of interest and return.

7. The apparatus as claimed in claim 6 wherein said generating and transmitting activating means includes gating and timing means operable to establish the signal duration and signal repetition frequency for signals generated by said generating and transmitting means.

8. The apparatus as claimed in claim 7 wherein said selective direction means is mechanically operable.

9. The apparatus as claimed in claim 7 wherein said selective direction means is electronically operable.

10. The apparatus as claimed in claim 7 wherein said selective direction means is electromechanically operable.

11. The apparatus as claimed in claim 5, further comprising selective direction means operable to adjust the generating transmitting means and the receiving means and thereby vary the position within which fluid motion is determined.

12. The apparatus as claimed in claim 11, said selective direction means utilizing a transducer array.

13. The apparatus as claimed in claim 11, said selective direction means utilizing a linear transducer array.

14. The apparatus as claimed in claim 11, said selective direction means utilizing an annular transducer array.

15. The apparatus as claimed in claim 5 wherein said generated fluid motion indication is by audio means.

16. The apparatus as claimed in claim 5 wherein said generated fluid motion indication is by video means.

17. The apparatus as claimed in claim 5 wherein said generated fluid motion indication is by printed means.

18. The apparatus as claimed in claim 5 wherein said generating and transmitting means is a transducer.

19. The apparatus as claimed in claim 4 wherein said receiving means is a transducer.

20. The apparatus as claimed in claim 5 wherein said generating and transmitting means and said receiving means are formed by a single transducer.

21. The apparatus as claimed in claim 20 wherein said single transducer is used cooperatively in a pulsed Doppler Mode system.

22. The apparatus as claimed in claim 20 wherein said single transducer is used cooperatively in a B-Mode imaging system.

23. The apparatus as claimed in claim 20 wherein said single transducer is used cooperatively in an M-Mode imaging system.

* * * * *